United States Patent
Hung et al.

(10) Patent No.: US 8,405,246 B2
(45) Date of Patent: Mar. 26, 2013

(54) POWER SUPPLY CIRCUIT FOR MOTHERBOARD

(75) Inventors: Hsiang-Jui Hung, Taipei Hsien (TW); Kun-Lung Wu, Taipei Hsien (TW); Yuan-Lin Liu, Taipei Hsien (TW); Yong-Xian Zhao, Shenzhen (CN); Lei Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 258 days.

(21) Appl. No.: 12/870,642

(22) Filed: Aug. 27, 2010

(65) Prior Publication Data

US 2011/0278924 A1 Nov. 17, 2011

(30) Foreign Application Priority Data

May 14, 2010 (CN) .......................... 2010 1 0172496

(51) Int. Cl.
*H02J 3/14* (2006.01)

(52) U.S. Cl. ...................................................... 307/31

(58) Field of Classification Search ..................... 307/31; 713/1, 300, 330; 323/271, 382, 285, 283
See application file for complete search history.

(56) References Cited

U.S. PATENT DOCUMENTS

| | | | | |
|---|---|---|---|---|
| 7,679,218 | B1* | 3/2010 | Isham | 307/75 |
| 7,791,324 | B2* | 9/2010 | Mehas et al. | 323/283 |
| 7,791,327 | B2* | 9/2010 | Liu | 323/285 |
| 7,884,590 | B2* | 2/2011 | Liu | 323/282 |
| 8,049,473 | B2* | 11/2011 | Hu | 323/271 |
| 8,195,963 | B2* | 6/2012 | Zhou et al. | 713/300 |
| 2009/0180303 | A1* | 7/2009 | Liu | 363/21.14 |
| 2009/0189661 | A1* | 7/2009 | Kao et al. | 327/172 |
| 2010/0133905 | A1* | 6/2010 | Chang et al. | 307/31 |
| 2010/0211811 | A1* | 8/2010 | Zhou et al. | 713/330 |
| 2010/0264889 | A1* | 10/2010 | Hu | 323/282 |
| 2011/0095743 | A1* | 4/2011 | Zhou | 323/290 |
| 2011/0254522 | A1* | 10/2011 | Lin | 323/282 |
| 2012/0038335 | A1* | 2/2012 | Hung et al. | 323/282 |

* cited by examiner

*Primary Examiner* — Daniel Cavallari
(74) *Attorney, Agent, or Firm* — Altis Law Group, Inc.

(57) ABSTRACT

A power supply circuit for providing power and detecting a plurality of loads' input voltages on a motherboard includes a pulse width modulation (PWM) controller, a voltage output circuit and a voltage feedback circuit electrically connected to the PWM controller and the plurality of loads. The PWM controller outputs PWM control signals. The voltage output circuit receives the PWM control signals and outputs working voltage to the plurality of loads according to the received PWM control signals. The voltage feedback circuit detects the plurality of loads' input voltages and outputs feedback signals to the PWM controller according to the detected input voltages. The PWM controller adjusts its PWM control signal outputs, according to the received feedback signals, and adjusting working voltages to the plurality of loads.

14 Claims, 3 Drawing Sheets

POWER SUPPLY CIRCUIT FOR MOTHERBOARD

BACKGROUND

1. Technical Field

The disclosure generally relates to power supply circuits, especially to a power supply circuit for motherboard with voltage feedback circuit.

2. Description of Related Art

With the rapid development of personal computers, development of high performance components for computers have brought about a corresponding increase in power use. A motherboard has a crucial effect on the stability of the computer. A power supply circuit is specially designed for providing power to the motherboard. The typical power supply circuit detects an input voltage of a load on the motherboard and adjusts its voltage output to the load according to the detected input voltage. However, the typical power supply circuit can only detect an input voltage of a single load at a time. When the power supply circuit provides power to multiple loads on the motherboard, the power supply circuit cannot detect input voltages of the multiple loads and adjust input voltage for each of the multiple loads. Further, loads on the motherboard may cause digital errors and make the computer reboot.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
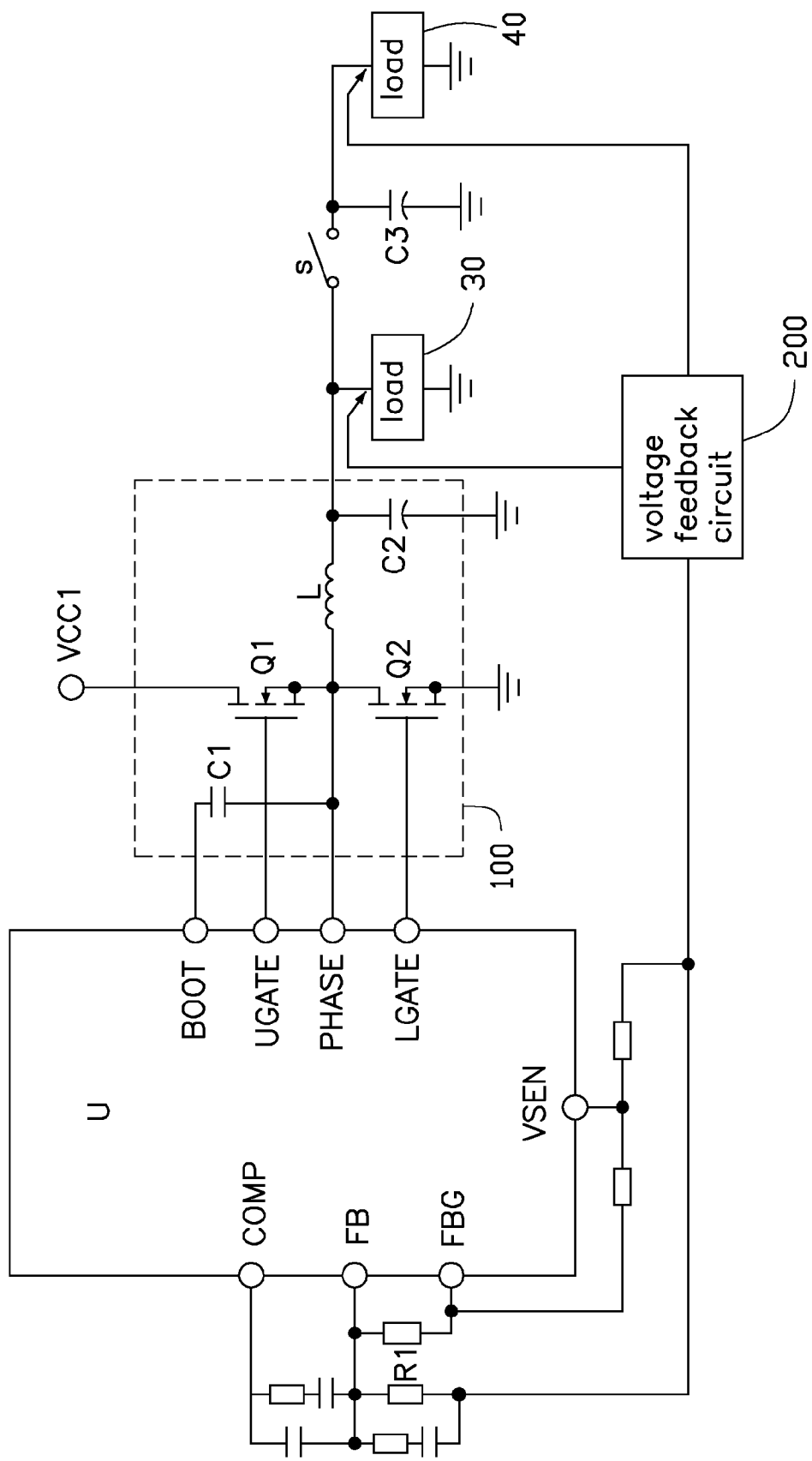
FIG. 1 is a circuit diagram of an embodiment of a power supply circuit for motherboard.

Referring to FIG. 1, a power supply circuit for motherboard provides power and detects two loads 30 and 40 input voltages includes a pulse width modulation (PWM) controller U, a voltage output circuit 100 and a voltage feedback circuit 200 electrically connected to the PWM controller U and the loads 30, 40. The PWM controller U outputs PWM control signals to the voltage output circuit 100. The voltage output circuit 100 outputs working voltages to the loads 30, 40 according to the received PWM control signals. The voltage feedback circuit 200 detects the loads 30, 40 input voltages respectively, and outputs feedback signals to the PWM controller U according to the detected input voltages. The PWM controller U adjusts its PWM control signal outputs according to the received feedback signals, and adjusts working voltages to the loads 30, 40.

The PWM controller U includes a boot terminal BOOT, an upper drive terminal UGATE, a phase terminal PHASE, a lower drive terminal LGATE, a compensation terminal COMP, a feedback terminal FB, a feedback ground terminal FBG and a power terminal VSEN. The voltage output circuit 100 includes MOSFETs Q1 and Q2, capacitors C1, C2 and inductor L. The upper and lower drive terminals UGATE and LGATE are electrically connected to the MOSFETs Q1 and Q2 grids respectively. A MOSFET Q1 drain receives a DC voltage VCC1. A MOSFET Q2 source is grounded. A MOSFET Q1 source and a MOSFET Q2 drain are grounded by the inductor L and capacitor C2 connected in series. A connection point between the inductor L and capacitor C2 outputs the working voltages. The boot terminal BOOT is electrically connected to the phase terminal PHASE through the capacitor C1. The phase terminal PHASE is electrically connected to the MOSFET Q1 source and the MOSFET Q2 drain respectively. The connection point between the inductor L and capacitor C2 is grounded by the load 30, and is grounded through a switch S and the load 40 connected in series. A connection point between the switch S and the load 40 is grounded by a capacitor C3. In one embodiment, the MOSFETs Q1 and Q2 are N channel MOSFETs.

Figure 2:
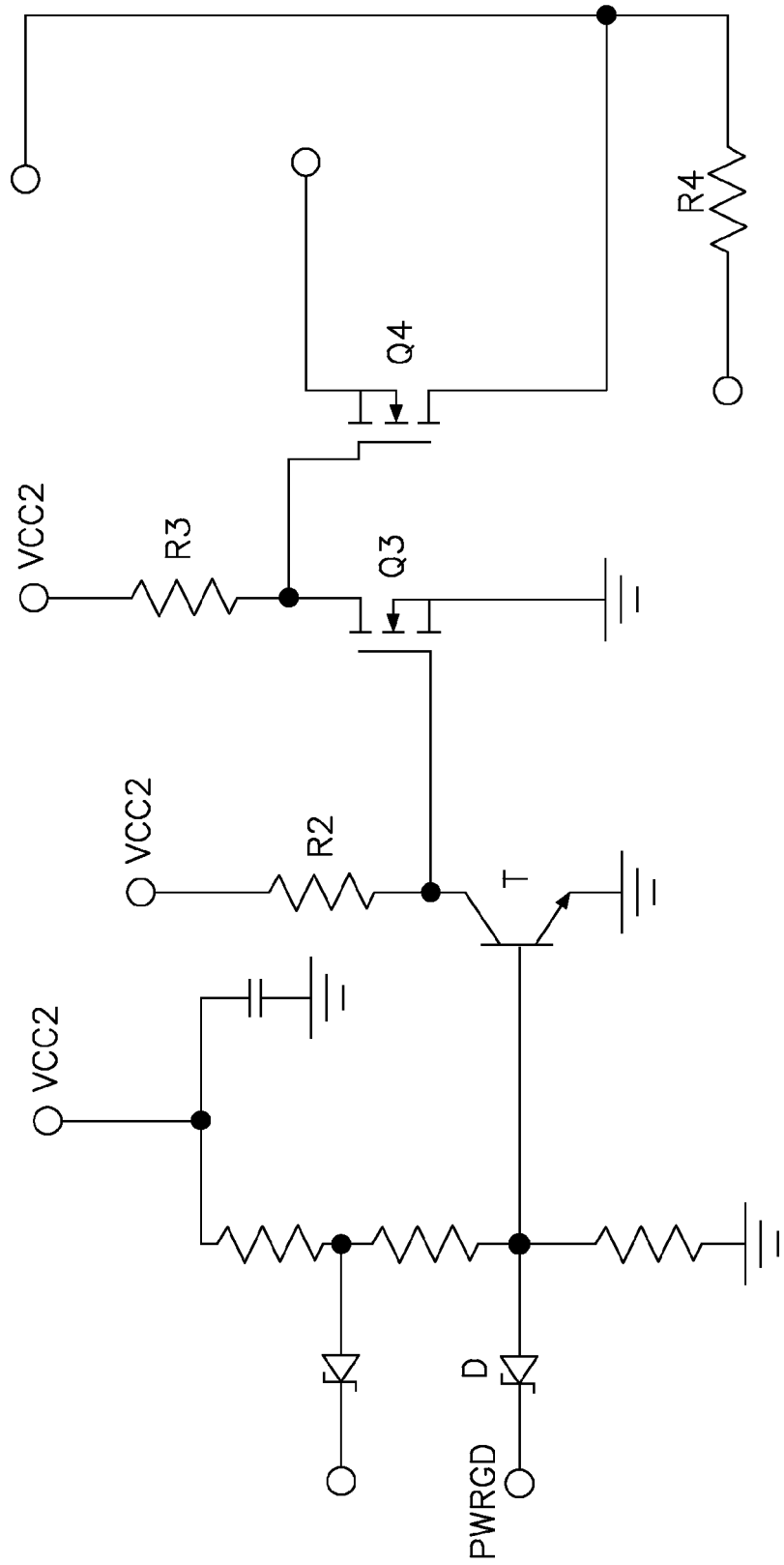
FIG. 2 is a circuit diagram of the voltage feedback circuit of FIG. 1.

Referring to FIG. 2, the voltage feedback circuit 200 includes a transistor T, MOSFETs Q3 and Q4, Zener diode D and resistors R2~R4. A transistor T base is electrically connected to a diode D anode. A diode D cathode receives a power-good signal PWRGD. A transistor T source is grounded. A transistor T collector receives a DC voltage VCC2 through the resistor R2. The transistor T collector is electrically connected to a MOSFET Q3 grid. A MOSFET Q3 source is grounded. A MOSFET Q3 drain receives the DC voltage VCC2 through the resistor R3. The MOSFET Q3 drain is electrically connected to a MOSFET Q4 grid. A MOSFET Q4 source is grounded by the load 40. A MOSFET Q4 drain is grounded through the resistor R4 and load 30 connected in series. The MOSFET Q4 drain is electrically connected to the feedback terminal FB through a resistor R1. In one embodiment, the transistor T is a NPN type transistor; the MOSFETs Q3 and Q4 are N channel MOSFETs.

In use, when the switch S turns off, the PWM controller U outputs PWM control signals and controls the voltage output circuit 100 to provide working voltage for the load 30. The power-good signal PWRGD is low voltage level. The transistor T turns off. The MOSFET Q3 turns on and the MOSFET Q4 turns off. The load 30 input voltage is transmitted to the PWM controller U through the resistor R4. The PWM controller U adjusts its PWM control signal outputs, according to the received load 30 input voltage, and adjusts the working voltage to the load 30.

When the switch S turns on, the PWM controller U outputs PWM control signals and controls the voltage output circuit 100 to provide working voltages for the loads 30, 40. The power-good signal PWRGD is high voltage level. The transistor T turns on. The MOSFET Q3 turns off, and the MOSFET Q4 turns on. The load 30 input voltage is transmitted to the PWM controller U through the resistor R4. The load 40 input voltage is transmitted to the PWM controller U through the MOSFET Q4. The PWM controller U adjusts its PWM control signal outputs, according to the received loads 30 and 40 input voltages, and adjusts working voltages to the loads 30, 40. A loads 30 and 40 input voltages receiving proportion is adjustable by changing a resistor R4 resistance, therefore the PWM control signal adjusting strength is adjusted.

Figure 3:
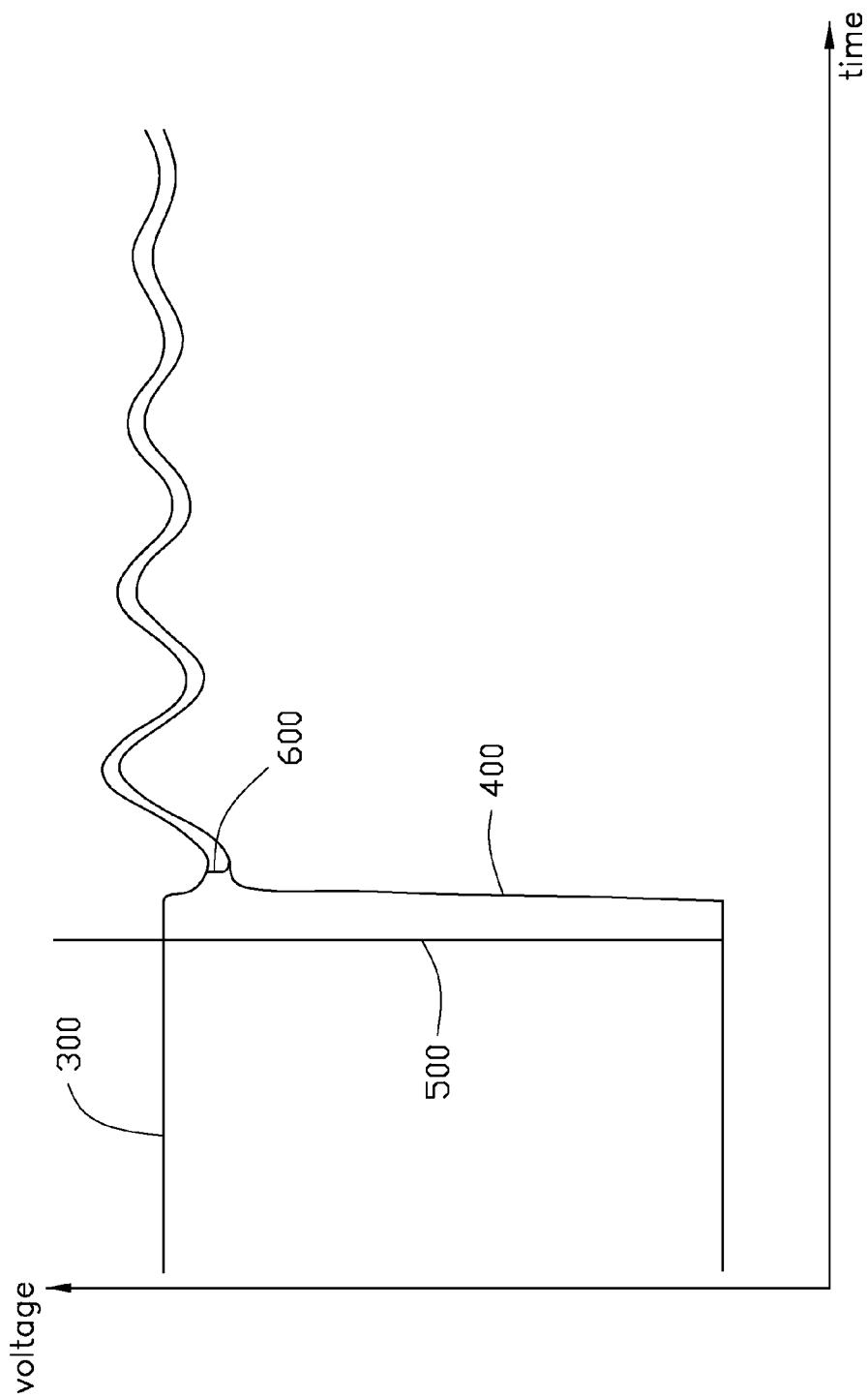
FIG. 3 is a comparative graph showing signal waveforms of power-good signals, feedback signals, and input voltage signals of two loads on the motherboard.

Referring to FIG. 3, an oscillographic is used to detect the power-good signal waveforms, feedback signals and the loads 30 and 40 input voltage signals on a motherboard (not shown). Signal waveforms 300, 400, 500, 600 are corresponding to the loads 30 and 40 input voltages, power-good signals and feedback signals respectively. In FIG. 3, when the power-good signal PWRGD is low voltage level, the feedback signal waveform 600 received by the PWM controller U overlapping the load 30 input voltage signal waveform 300. When the power-good signal PWRGD is high voltage level, the feedback signal waveform 600 received by the PWM controller U is delayed for a short period and then overlaps the load 40 input voltage signal waveform 400.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A power supply circuit for providing power and detecting input voltages of a plurality of loads on a motherboard, comprising:

a pulse width modulation (PWM) controller capable of outputting PWM control signals; the PWM controller comprises a first drive terminal, a phase terminal, a second drive terminal and a feedback terminal;

a voltage output circuit capable of receiving the PWM control signals and outputting working voltage to the plurality of loads according to the received PWM control signals; the voltage output circuit comprises a first MOSFET and a second MOSFET; the first and second drive terminals are electrically connected to grids of the first and second MOSFETs; a first MOSFET drain is capable of receiving a first voltage; a second MOSFET source is grounded; a first MOSFET source and a second MOSFET drain are electrically connected to output working voltages; and the phase terminal is electrically connected to the first MOSFET source and the second MOSFET drain; the plurality of loads comprises a first load and a second load; the first MOSFET source and the second MOSFET drain are electrically connected to each other and grounded by the first load; and the first MOSFET source and the second MOSFET drain are electrically connected and grounded through a switch and the second load that are connected in series; and a voltage feedback circuit electrically connected to the PWM controller and the plurality of loads; wherein the voltage feedback circuit is capable of detecting the input voltages of a plurality of loads and outputting feedback signals to the PWM controller according to the detected input voltages; and the PWM controller is capable of adjusting its PWM control signal outputs, according to the received feedback signals, and adjusting working voltages to the plurality of loads; the voltage feedback circuit comprises a transistor, a third MOSFET and a fourth MOSFET; a transistor base is capable of receiving a power-good signal; a transistor source is grounded; a transistor collector is capable of receiving a second voltage through a first resistor; the transistor collector is electrically connected to a third MOSFET grid; a third MOSFET source is grounded; a third MOSFET drain is capable of receiving the second voltage through a second resistor; the third MOSFET drain is electrically connected to a fourth MOSFET grid; a fourth MOSFET source is grounded by the second load; a fourth MOSFET drain is grounded by the first load; and the fourth MOSFET drain is electrically connected to the feedback terminal.

2. The power supply circuit of claim 1, wherein the PWM controller further comprises a boot terminal; and the boot terminal is electrically connected to the phase terminal through a capacitor.

3. The power supply circuit of claim 1, wherein the first and second MOSFETs are N channel MOSFET.

4. The power supply circuit of claim 1, wherein the transistor is a NPN type transistor; the third and fourth MOSFETs are N channel MOSFETs.

5. The power supply circuit of claim 4, wherein when the switch turns off, the transistor base is capable of receiving a low voltage level power-good signal, and the input voltage of the first load is capable of being transmitted to the PWM controller through the voltage feedback circuit.

6. The power supply circuit of claim 4, wherein when the switch turns on, the transistor base is capable of receiving a high voltage level power-good signal, and the input voltages of the first and second loads are capable of being transmitted to the PWM controller through the voltage feedback circuit.

7. A power supply circuit, comprising:

a pulse width modulation (PWM) controller capable of outputting PWM control signals;

a voltage output circuit capable of receiving the PWM control signals and outputting working voltage to a plurality of loads according to the received PWM control signals; and a voltage feedback circuit electrically connected to the PWM controller and the plurality of loads; wherein the voltage feedback circuit comprises a switch element capable of receiving a power-good signal; the voltage feedback circuit is capable of detecting the input voltages of a plurality of loads according to the power-good signal and outputting feedback signals to the PWM controller according to the detected input voltages; and the PWM controller is capable of adjusting its PWM control signal outputs, according to the received feedback signals, and adjusting working voltages to the plurality of loads; wherein the PWM controller comprises a first drive terminal, a phase terminal and a second drive terminal; the voltage output circuit comprises a first MOSFET and a second MOSFET; the first and second drive terminals are electrically connected to grids of the first and second MOSFETs; a first MOSFET drain is capable of receiving a first voltage; a second MOSFET source is grounded; a first MOSFET source and a second MOSFET drain are electrically connected to output working voltages; and the phase terminal is electrically connected to the first MOSFET source and the second MOSFET drain.

8. The power supply circuit of claim 7, wherein the PWM controller further comprises a boot terminal; and the boot terminal is electrically connected to the phase terminal through a capacitor.

9. The power supply circuit of claim 7, further comprising a switch; the plurality of loads comprises a first load and a second load; the first MOSFET source and the second MOSFET drain are electrically connected and grounded by the first load; and the first MOSFET source and the second MOSFET drain are electrically connected and grounded through the switch and the second load that are connected in series.

10. The power supply circuit of claim 7, wherein the first and second MOSFETs are N channel MOSFET.

11. The power supply circuit of claim 9, wherein the PWM controller further comprises a feedback terminal; the switch element is a transistor; the voltage feedback circuit further comprises a third MOSFET and a fourth MOSFET; a transistor base is capable of receiving a power-good signal; a transistor source is grounded; a transistor collector is capable of receiving a second voltage through a first resistor; the transistor collector is electrically connected to a third MOSFET grid; a third MOSFET source is grounded; a third MOSFET drain is capable of receiving the second voltage through a second resistor; the third MOSFET drain is electrically connected to a fourth MOSFET grid; a fourth MOSFET source is grounded by the second load; a fourth MOSFET drain is grounded by the first load; and the fourth MOSFET drain is electrically connected to the feedback terminal.

12. The power supply circuit of claim 11, wherein the transistor is a NPN type transistor; the third and fourth MOSFETs are N channel MOSFETs.

13. The power supply circuit of claim 12, wherein when the switch turns off, the transistor base is capable of receiving a low voltage level power-good signal, and the input voltage of the first load is capable of being transmitted to the PWM controller through the voltage feedback circuit.

14. The power supply circuit of claim 12, wherein when the switch turns on, the transistor base is capable of receiving a high voltage level power-good signal, and the input voltages of the first and second loads are capable of being transmitted to the PWM controller through the voltage feedback circuit.

* * * * *